United States Patent [19]

Zibble et al.

[11] Patent Number: 4,751,936
[45] Date of Patent: Jun. 21, 1988

[54] PORTABLE FIELD BLIND

[75] Inventors: Thomas L. Zibble; William W. Habedank; Lowell E. Warnsholz, all of Red Wing, Minn.

[73] Assignee: Red Wing Outdoor Innovators, Inc., Red Wing, Minn.

[21] Appl. No.: 40,869

[22] Filed: Apr. 20, 1987

[51] Int. Cl.⁴ .............................................. A01M 31/00
[52] U.S. Cl. .................................... 135/117; 135/109; 135/901; 43/1
[58] Field of Search ............... 135/112, 117, 901, 109; 43/1

[56] References Cited

U.S. PATENT DOCUMENTS

| | | | |
|---|---|---|---|
| 2,864,388 | 12/1958 | Oliver | 135/112 |
| 3,323,530 | 6/1967 | Smith | 135/106 |
| 3,622,201 | 1/1971 | Radig | 297/217 |
| 3,799,608 | 3/1974 | Smutny et al. | 135/901 |
| 3,848,352 | 11/1974 | Sayles | 43/1 |
| 3,902,264 | 9/1975 | Radig | 43/1 |
| 4,106,145 | 8/1978 | Gillen et al. | 135/901 |
| 4,123,869 | 11/1978 | Witt | 43/1 |
| 4,164,089 | 8/1979 | George | 135/901 |
| 4,483,090 | 11/1984 | Carper | 43/1 |
| 4,581,837 | 4/1986 | Powlus | 43/1 |
| 4,683,672 | 8/1987 | Davis | 135/901 |

Primary Examiner—Carl D. Friedman
Assistant Examiner—Caroline D. Dennison
Attorney, Agent, or Firm—Moore & Hansen

[57] ABSTRACT

A hunting blind comprising an elongated frame assembly of sufficient length to extend over a hunter lying under the blind incorporates a pivotal canopy frame with ground engaging, side support flaps. The canopy frame is hingedly connected to one end of a top frame segment of a base frame supported on foldable legs. An elongated spring is connected between the canopy frame and the base frame. A hunter lying under the frame assembly may exert slight upward force on the canopy frame as he sits up, so as to thereby cause the spring to rapidly pull the canopy frame to an open position over the top frame segment. An unobstructed field of vision and fire is thus presented to the hunter as he sits up.

15 Claims, 3 Drawing Sheets

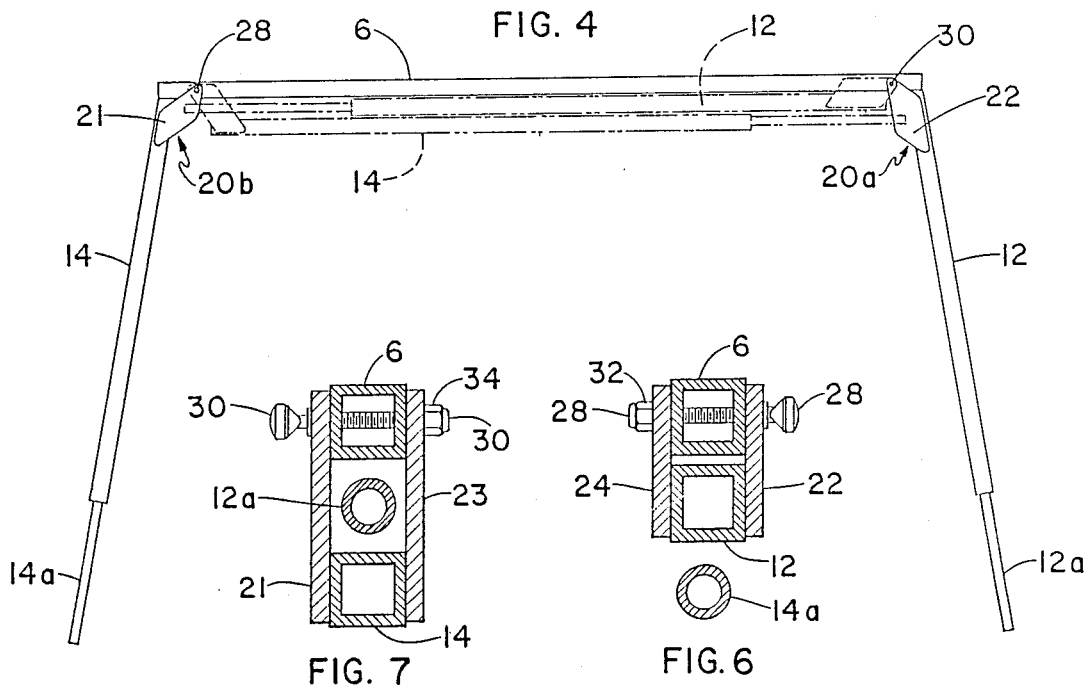
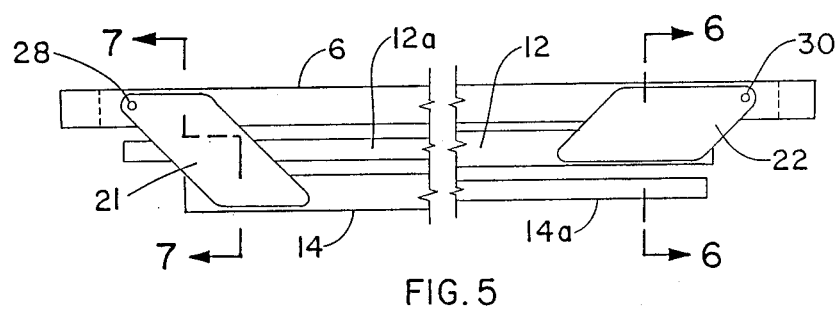
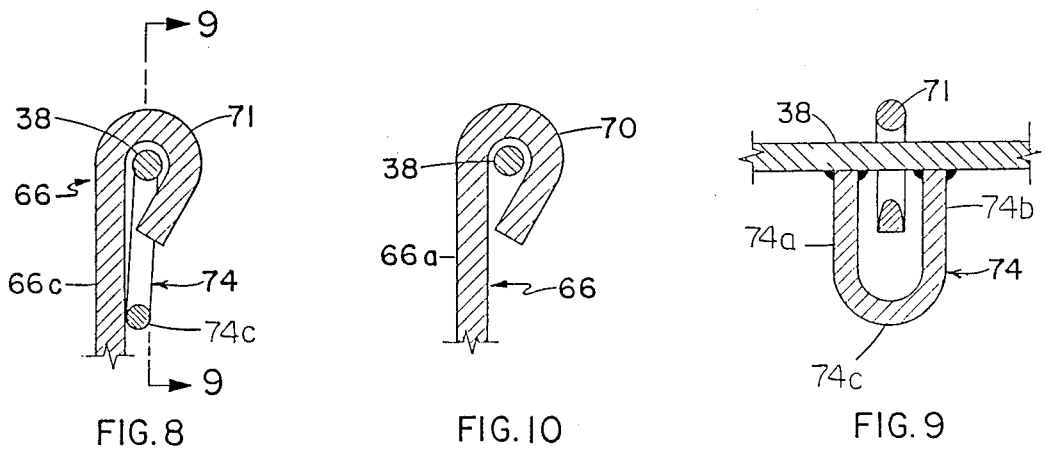

PORTABLE FIELD BLIND

BACKGROUND OF THE INVENTION

This invention is directed to a portable field blind useful by waterfowl hunters as well as by photographers of wildlife.

Blinds which may be set up in the field and covered with camouflage are known, with such blinds having hinged covers swingable to an open position for exposing a field of view for shooting. U.S. Pat. Nos. 3,848,352 and 3,323,530 issued to Chester M. Sayles and R. A. Smith, respectively, disclose such hunting blind structures. The hunting blinds of both of those patents incorporate top covers which may be biased to an open position with the aid of resilient elastic bands or cords. The cover of the Sayles patent is hingedly mounted on a vertical post at such a level that a hunter may sit under it. The cover opens only to a generally vertical, upright position in a direction against the wind. Thus, with the blind of Sayles oriented properly so that the hunter is facing waterfowl as they land in their normal direction against the wind, the wind would be opposing the opening of the cover. The flexible top cover of the Smith patent relies upon a trip cord for release, and utilizes elastic cords 36 attached to the edge of the blind structure which also serves as the pivot axis for the top cover. With this arrangement, it is very questionable as to whether sufficient leverage would be exerted by the elastic cords to pull the top cover fully open, without continuing manual assistance from the hunter inside the blind.

Neither the Sayles nor the Smyth patent provides a blind structure which would be suitable for covering a hunter lying on the ground in such a way that an hinged canopy could be rapidly actuated to an open position. There is a continuing need for such a portable blind which can be collapsed to a compact transport assembly, and rapidly and easily erected in the field.

U.S. Pat. Nos. 3,902,264, 3,622,201, and 4,483,090 issued to Theodore N. Radig and Jackie D. Carper, respectively, also disclose portable hunting blinds having coverings shiftable or collapsible to open positions, so as to expose a field of view to the persons inside the blind. None of the blind structures disclosed in those patents meet the aforesaid need for the type of hunting blind suitable and effective for concealing a hunter lying on the ground, while permitting him to rapidly rise to a sitting position as he trips or releases a covering canopy to cause it to be spring biased to a fully open position.

BRIEF SUMMARY OF THE INVENTION

The portable field blind disclosed herein is particularly characterized by a lightweight frame assembly which may be readily collapsed for transport and which may be quickly and easily set up in the field in a secure, ground-anchored position so as to provide cover and concealment for a hunter lying on the ground.

A canopy portion of the frame assembly overlying the upper portion of the hunter's body must be quickly swung to an open position exposing a field of fire above the blind.

These basic objectives are realized by a frame assembly comprised of a base frame having a top frame segment supported on foldable, ground-engaging legs and a canopy frame pivotally attached to one end of the top frame segment for upward, swinging movement about an horizontal pivot axis. The canopy frame is also supported on collapsible, ground-engaging members. The top frame segment and the canopy frame together form an elongated frame supported above the ground and of sufficient length to cover a hunter or photographer lying thereunder.

As a particularly beneficial feature, an elongated spring member is removably connected between the canopy frame and the opposite end of the top frame segment. When the canopy frame is swung downwardly to its horizontal covering position, the spring is placed in tension. A slight upward force on the underside of the canopy frame by the hunter moves it to a predetermined spring return position at which the spring is actuated to exert a strong pulling force serving to swing the canopy frame to a fully open position.

A further advantageous feature of the blind structure resides in the use of rigid side flaps swingably mounted on side rod segments of the canopy frame as the ground-engaging support members for the canopy frame. These side flaps can be swung in and out to adjust the height of the canopy frame, and are deflected outwardly away from the top of the frame assembly as the canopy is swung to its open position by guide stop members attached to the canopy frame. This structural arrangement ensures that the side support flaps for the canopy frame will not swing to a position over the top of the frame assembly where they might obstruct the user's view and field of fire.

A foldable camouflage cover is provided for removable attachment over the frame assembly. The cover preferably has viewing apertures therethrough.

These and other objects and advantages of the invention will be readily understood as the following description is read in conjunction with the accompanying drawings wherein like reference numerals have been used to designate like elements throughout the several views.

BRIEF DESCRIPTION OF THE DRAWINGS

FIG. 4 is an end view of the base frame as viewed from the right end of FIG. 3;

FIG. 5 is a fragmentary view, on an enlarged scale, of the foldable legs for the base frame as seen in FIG. 4;

FIG. 6 is a vertical section view of one end of the foldable base frame legs taken along lines 6—6 of FIG. 5;

FIG. 7 is a vertical section view, similar to FIG. 6, but taken in the opposite direction along lines 7—7 of FIG. 5;

FIG. 8 is a vertical section view through a portion of the canopy frame taken along lines 8—8 of FIG. 3;

FIG. 9 is a vertical section view taken along lines 9—9 of FIG. 8; and

FIG. 10 is a fragmentary, vertical section view of a different portion of the canopy frame take along lines 10—10 of FIG. 3.

DESCRIPTION OF THE PREFERRED EMBODIMENT

Figure 3:
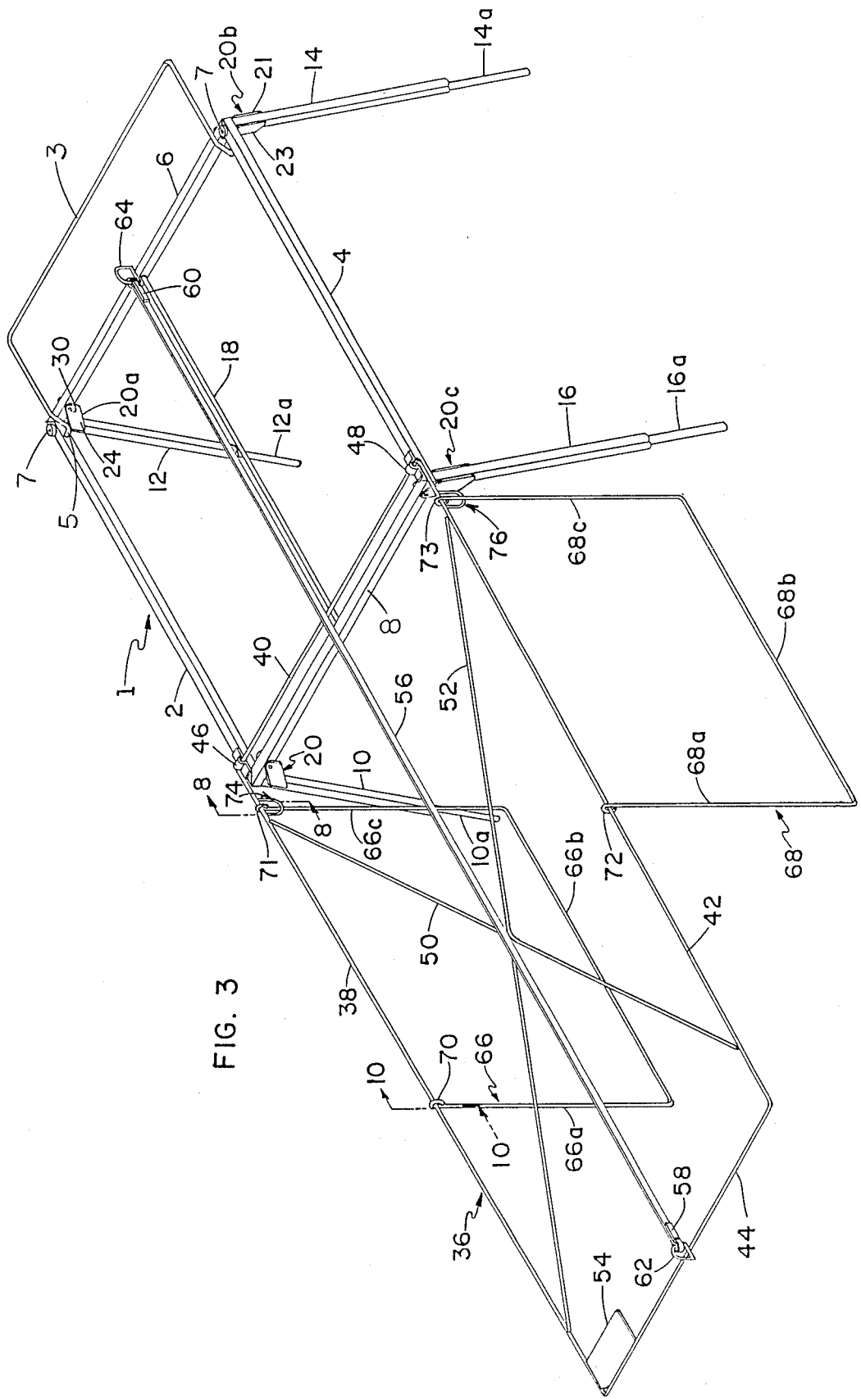
FIG. 3 is a perspective view of the frame assembly for the blind.

Referring now to the drawings, the frame assembly for the portable field blind is shown in FIG. 3. The frame assembly is generally comprised of a base frame 1 and a canopy frame 36. Base frame 1 has a top frame of generally rectangular shape as shown, comprised of side bar segments 2 and 4 and end bar segments 6 and 8. Those frame members are preferably tubular steel of square cross section. The aforesaid top frame segment of the base frame 1 is supported on a plurality of foldable legs 10, 12, 14, and 16. The lower end portion of each of the base frame legs is narrower than the main body of the legs so as to form stakelike leg portions 10a, 12a, 14a, and 16a which are forced into the ground for secure anchoring of the base frame.

A steel support brace 18 extends lengthwise of the top frame segment of the base frame between end frame members 6 and 8 to lend strength and rigidity to the frame structure. A top frame extension 3 may be utilized as shown in FIG. 3 to add length to the top frame segment. Extension 3 has outwardly extending mounting pin segments 5 at its end extremities which are pivotally received within apertures of side bar members 2 and 4 of the base frame. Frame extension 3 may thus be snapped into place through such apertures, by means of its mounting pin segments 5, and swung over end frame member 6 to the horizontal position of use as shown in FIG. 3.

Base frame legs 10, 12, 14, and 16 are foldably attached to the corners of the top frame segment by hinge assemblies generally indicated by reference numerals 20, 20a, 20b and 20c. As may best be understood by reference to FIGS. 4–7, as well as to FIG. 3, each of the hinge assemblies is comprised of a pair of parallel hinge plates mounted and constructed identically on the top of each of the frame legs. Such hinge plates are designated by reference numerals 21 and 23 for leg 14, and by numerals 22 and 24 for leg 12. Hinge pins, as illustrated with respect to hinge pins 28 and 30 for legs 12 and 14 extend through the opposed pairs of hinge plates and through the adjacent tubular end frame members 6 and 8 of the top frame segment, and are held in place by retention nuts, such nuts being indicated by reference numerals 32 and 34 for hinge pins 28 and 30 on legs 12 and 14.

The aforesaid hinge mounting arrangement for the frame legs 10, 12, 14, and 16 permits the legs to be folded upwardly as viewed in FIG. 4 to collapsed positions against the underside of the top frame segment, with one leg under the other as best shown in FIGS. 4–7. With the legs thus in their inwardly folded, collapsed positions, leg 12 will be uppermost as viewed in FIG. 4, and when leg 14 is swung upwardly and inwardly, its parallel, spaced-apart hinged plates 21 and 23 will embrace stake end portion 12a of leg 12 as shown in FIG. 7. As is indicated in FIGS. 5 and 6, leg 14 will be folded snuggly under leg 12, with its stake end portion 14a lying under leg 12. Legs 10 and 16 are folded upwardly and inwardly under end frame member 8 in the same manner.

The frame bar segments 2, 4, 6, and 8 of the top frame segment of the base frame are preferably made of tubular steel. The adjacent canopy frame 36 is a lighter weight assembly, preferably comprised of steel rod formed to a generally rectangular shape as shown. Thus, canopy frame 36 has side rod segments 38 and 42 connected at their opposite ends by end rod segments 40 and 44. Canopy frame 36 is pivotally attached to the adjacent end of base frame 1 for swinging movement about an horizontal axis defined by its end rod segment 40. For that purpose, rod segment 40 is pivotally contained within hinge brackets 46 and 48 mounted on the adjacent ends of side frame members 2 and 4 of the top frame segment, next to end frame member 8.

The canopy frame is reinforced by V-shaped braces 50 and 52 welded at their outer ends to side rod segments 38 and 42. A metal name plate 54 may be affixed to one corner of canopy frame 36 as shown in FIG. 3, if desired.

For the purpose of urging canopy frame 36 to a fully open position as hereinafter described, an elongated spring member, preferably in the form of an elastic strap 56, is connected between end rod segment 44 of canopy frame 36 and end frame member 6 at the opposite, remote end of base frame 1. For this purpose, attachment rings 62 and 64 are welded or otherwise secured to end rod segment 44 and end frame member 6 at the locations shown in FIG. 3. Snap hooks 58 and 60 on the opposite ends of rubber spring strap 56 are secured through rings 62 and 64.

The canopy frame 36 also has ground engaging support members attached thereto. Preferably, such members take the form of the generally rectangular shaped, rigid side flaps 66 and 68. These side support flaps are comprised of steel rods formed to the generally rectangular shape shown. Thus, rigid side flap 66 is comprised of side flap legs 66a and 66c connected at their outer end extremities by a rigid, ground engaging segment 66b. In a identical manner, rigid side flap 68 is comprised of parallel side legs 68a and 68c connected at their outer ends by ground engaging segment 68b. Each of the side flap legs 66a, 66c, 68a and 68c are swingably mounted at their upper ends to side rod segments 38 and 42 of the canopy frame 36. For this purpose, the upper ends of those side flap legs are formed to the shape of loops or rings 70, 71, 72, and 73 swingably mounted on side rod segments 38 and 42.

In order to properly support and guide rigid side flaps 66 and 68 for the canopy frame 36, guide stop members 74 and 76 are secured to side rod segments 38 and 42. Preferably, those guide stop members are metal members of the U-shape shown, and are welded to the ends of side rod segments 38 and 42 adjacent to the pivotal end rod segment 40 of canopy frame 36. Each of the guide stop members 74 and 76 depends downwardly from the side rod segments 38 and 42 in underlying, supporting engagement with side flap legs 66c and 68c as shown in FIG. 3. The U-shape of each of the guide stop members 74 and 76 is defined by a pair of arms connected at their outer ends by a base member. Such a structure is illustrated in FIGS. 8 and 9 with respect to guide stop member 74, the two parallel arms being indicated by reference numerals 74a and 74b and the base member by reference numeral 74c. As may be noted with respect to FIGS. 8 and 9, the two parallel arms 74a and 74b of guide stop member 74 are welded to side rod segment 38 of the canopy frame 36 on opposite sides of attachment ring 71 for side flap leg 66c. The same mounting location and arrangement is utilized with respect to guide stop member 76 as to its mounting on side rod segment 42. Thus, the guide stop members 74 and 76 serve to restrain the sliding movement of side flap legs along side rod segments 38 and 42 of the canopy frame 36. FIG. 10 illustrates the swingable mounting of side flap leg 66a on side rod segment 38 by means of its looped upper end 70. The same mounting arrangement is used for side flap leg 68a of side flap 68 on side rod segment 42.

Figure 1:
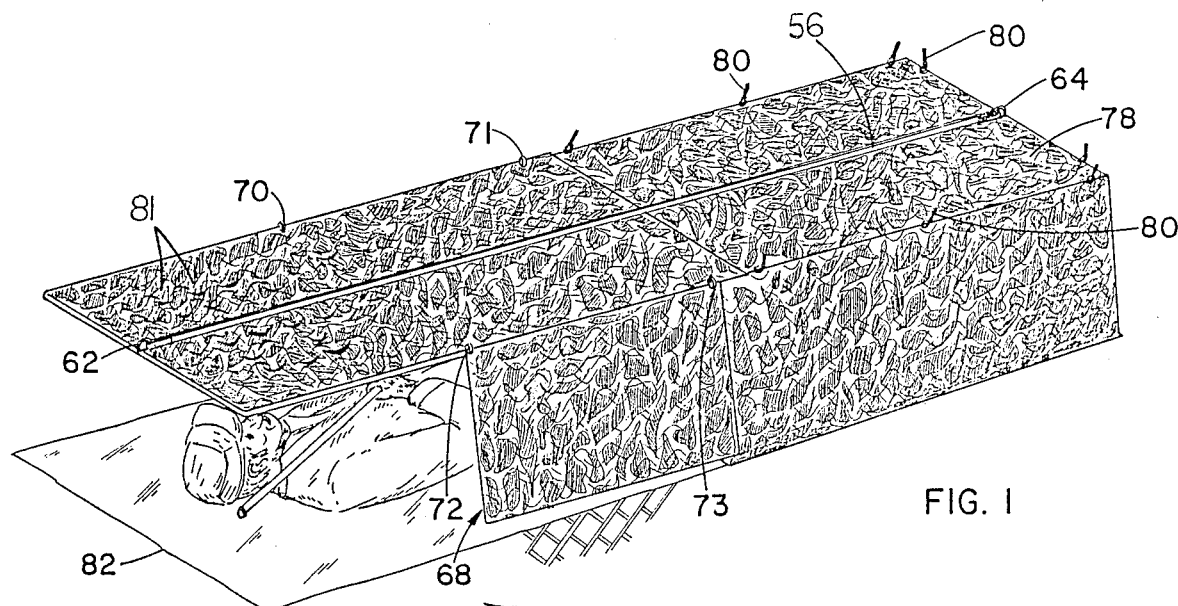
FIG. 1 is a perspective view of the blind as fully assembled.
Figure 2:
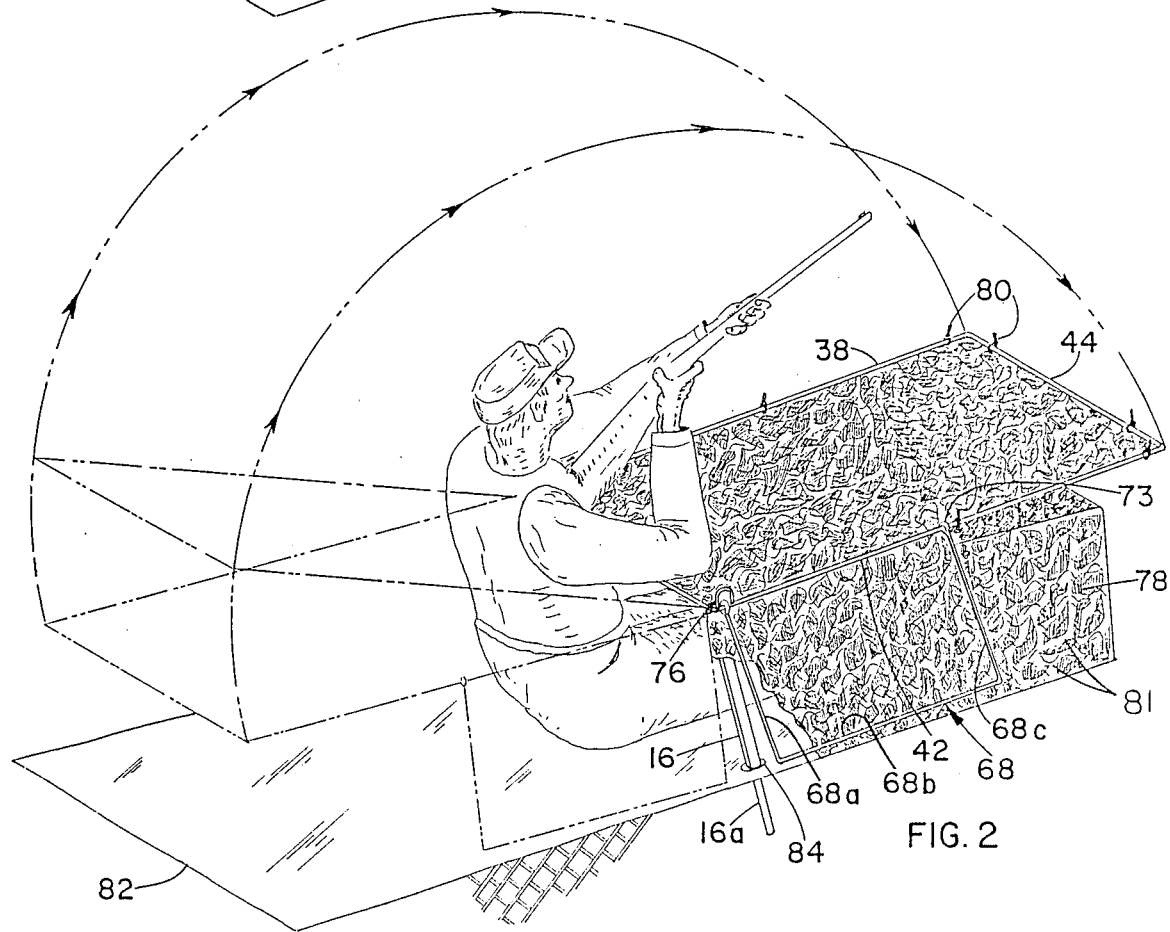
FIG. 2 is a perspective view similar to FIG. 1 and showing the hinged canopy swung to its open position.

As is illustrated in FIGS. 1 and 2, a camouflage cover 78 may be draped over the entire frame assembly to conceal a hunter or a photographer from wildlife. The camouflage cover preferably is of the type made from a leafy, see-through material as sold under the trade name Dukoflage ™ by Duckman Division of H. N. Gilman & Associates, Inc. of Maple Grove, Minn. Such camouflage material has cut-out openings or apertures 81 therein, through which the hunter may observe the area surrounding the blind. Camouflage cover 78 is removably secured to base frame 1 and to the canopy frame 36 by flexible fastener ties 80 which are inserted through the apertures 81 in the cover and tied around the rod and bar segments of the frame members as shown in FIGS. 1 and 2.

In operation, the blind frame assembly is stored and transported in a collapsed, folded condition. In such a condition, legs 10, 12, 14, and 16 of the base frame 1 are in their folded positions as shown in FIG. 5 and in phantom line in FIG. 4; and the side support flaps 66 and 68 of the canopy frame 36 are also folded inwardly against the canopy frame. The canopy frame itself will be stored and transported in a folded position on top of base frame 1, with side rod segments 38 and 42 of canopy frame 36 lying on top of side bar members 2 and 4 of the top frame segment. At the field use site, the base frame legs 10, 12, 14, and 16 are folded downwardly and outwardly to their upright support positions as shown in FIG. 3, and the stake end segments 10a, 12a, 14a, and 16a of those legs are pushed into the ground until they are fully embedded. The bottom end of the wider, main leg segments 10, 12, 14, and 16 act as stops against the top of the ground. With the base frame 1 thus firmly planted in the ground, the canopy frame or "trap door" 36 is swung counterclockwise as viewed in FIG. 2 to the fully extended, covering position shown in FIGS. 1 and 3. The side support flaps 66 and 68 should be folded outwardly and allowed to swing downwardly until they come to rest on the ground. The side support flaps can be swung inwardly (towards each other) to raise the canopy frame 36, and swinging the side support flaps outwardly away from each other, will lower the canopy frame 36. In this way, the canopy frame can be adjusted to the desired height.

The camouflage cover 78 is then draped over the top of the entire frame assembly. It is secured in place, as pointed out above, by fastening flexible tie strips 80 around the various frame rods and bar segments and inserting those tie strips through the apertures 81 in the camouflage cover. As shown in FIG. 1, the camouflage cover is also draped over the sides of the base frame and canopy frame, with tie strips also being utilized to secure the camouflage cover to side support flaps 66 and 68 of the canopy frame 36.

The elastic spring member 56 is then secured in place. This is done with the canopy frame 36 folded in a clockwise direction as viewed in FIG. 3 to its fully open position on top of base frame 1. This will bring fastener rings 62 and 64 in close proximity to each other. The opposite ends of elastic spring member 56 are then secured to the two fastener rings 62 and 64 by means of snap hooks 58 and 60. With the base frame securely and fully embedded in the ground, the canopy frame 36 is then swung in a counterclockwise direction to the fully extended, covering position as shown in FIG. 3 and in FIG. 1. As this is done, elastic spring member 56 will be stretched and put into tension, and thus "cocked." The elastic spring member 56 will thus extend over the camouflage material 78, as well as over the entire frame assembly, so that it will be free to function without interference.

If desired, a ground cloth 82 may be placed on the ground prior to erection of the frame assembly. With the blind erected as shown in FIG. 1 on top of the ground cloth 82, the hunter then may enter the blind by simply opening the canopy frame 36 and folding it over the top of the base frame to the open position shown in FIG. 2. The hunter then positions himself so he is standing at the hinged end of the base frame adjacent to end rod segment 40 of the canopy frame, which serves as the hinge member. The hunter then sits down on the ground and swings his legs under the base frame, with his midthigh area positioned approximately at the location of hinge rod segment 40. While holding his gun in one hand, the hunter grabs the hinged canopy frame 36 in the other hand, and pulls it downward as he leans back to assume a lying, prone position on his back under the blind as shown in FIG. 1. The canopy frame is thus pulled completely downwardly to its covering position as shown in FIG. 1. This has the effect of placing elastic spring member 56 in tension. The side support flaps 66 and 68 of the canopy frame will swing downwardly to their ground support positions to support the canopy over the hunter. When ducks, geese, or other game approach within shooting range, the hunter simply pushes upwardly on the bottom of the canopy frame 36 with one hand, while holding onto his gun with the other hand. When the canopy frame is raised a slight distance as indicated approximately by the phantom lines in FIG. 2, the elastic spring member 56 will be at an over-center or return position, at which point it will exert a rapid, pulling force in the direction of the foot end of base frame 1. As a result, canopy frame 36 will be quickly swung to a fully open position overlying base frame 1, as shown in FIG. 2. The canopy frame will move through substantially a fully 180 degree arc, and come to rest on top of rubber stop members 7. The rubber stop rests 7 for the canopy frame are located at the foot end of base frame 1, on top of the remote end of side bar members 2 and 4, as shown in FIG. 3. As the canopy frame 36 swings fully open to the position shown in FIG. 2, the hunter simultaneously raises to a "sit-up" position. The hunter is then ready to fire, with the canopy frame completely out of his way and resting on top of the base frame. It is to be noted that as the canopy frame swings to the fully open position, guide stop members 74 and 76 serve to deflect side flap supports 66 and 68 outwardly and downwardly so that they swing down away from the top of the frame assembly and come to rest along the sides thereof as shown in FIG. 2. This assures that the side flaps 66 and 68 will not remain over the top of the blind where they might obstruct the field of view or field of fire of the hunter.

As noted above, ground cloth 82 may be utilized to protect a hunter or photographer from damp, cold ground. The ground cloth 82 will be provided with apertures 84 through which the stake end of the base frame legs may be inserted to assist in holding the ground cloth in place. In FIG. 2, part of the camouflage covering 78 is broken away to show how one of the stake end portions 16a of one of the base frame legs is inserted through a hole 84 in the ground cloth 82.

It will be appreciated from the foregoing description, that the portable field blind disclosed herein permits a hunter to set up in the middle of a field, in the proper position with respect to field decoys for field hunting of waterfowl, without the need to dig a pit or to attempt to use natural cover, such as rock piles. The framework assembly supports a camouflage cover at an elevated location above the hunter, thereby permitting the hunter to move around undetected beneath the camouflage. Yet the blind presents a low profile, with the hunter lying in a prone position under it. The leg stakes 10a, 12a, 14a, and 16a can quickly be pulled out of the ground so that the blind may be repositioned as desired to accommodate changes in wind direction and/or flight patterns of waterfowl. It is to be noted that the canopy frame 36 is hinged to open towards the hunter's feet, in the direction he will be shooting towards waterfowl as they land into the wind. Wind force will thus assist the opening of the canopy.

It is anticipated that various changes may be made in the size, shape, and construction of the portable field blind as disclosed herein without departing from the spirit and scope of the invention as defined by the following claims.

What is claimed is:

1. A hunting blind comprising:
a base frame comprising a top frame segment attached to ground engaging members for support at an elevated horizontal position above the ground or other support surface;
a canopy frame pivotally attached to said base frame for swinging movement about an horizontal pivot axis between a fully extended, generally horizontal covering position extending from said base frame and substantially coplaner with said top frame, and an open position extending in overlying relation to said top frame, said canopy frame having ground engaging members attached thereto, whereby said canopy frame may be supported at an elevated position, said top frame segment of said base frame and said canopy frame forming together an elongated frame assembly of sufficient length to extend over the height of a hunter lying thereunder when said canopy frame is swung to said covering position; and
spring means connected between said canopy frame and said base frame, said spring means being placed in tension when said canopy frame is swung to said covering position, said spring means exerting a reaction force acting to pull said canopy to said open position in response to the upward movement of said canopy frame about said pivot axis to a predetermined spring return position.

2. An hunting blind as defined in claim 1 wherein:
said spring means comprises an elongated spring member secured between the end portion of said canopy frame most remote from said base frame and the opposite, end portion of said base frame, said spring member exerting a tension force on said canopy frame serving to rapidly pull said canopy frame toward said base frame about said pivot axis to said open position in response to very slight upward movement of said canopy frame about said pivot axis moving said spring member to said return position.

3. An hunting blind as defined in claim 2 wherein:
said spring member is a flexible, elongated elastic strap.

4. An hunting blind as defined in claim 2 wherein:
said spring member is releasably secured to the end extremity of said top frame segment of said base frame farthest from said canopy frame, and thereby serves to swing said canopy frame through substantially a 180 degree arc into overlying engagement with said top frame segment in response to upward force on said canopy frame, whereby a full, unobstructed field of fire and view is presented to the hunter as he rises to a sitting position while simultaneously exerting said upward force on said canopy frame to move said spring member to said return position.

5. An hunting blind as defined in claim 1 wherein:
said pivot axis is defined by an hinge connection between said canopy frame and said top frame segment at a location generally coinciding with the midthigh area of a hunter lying under said elongated frame assembly with his head and upper torso under said canopy frame, whereby the hunter may rise to a full sitting position for shooting as said canopy frame swings to said open position.

6. An hunting blind as defined in claim 1 wherein:
said ground engaging members of said base frame comprise a plurality of legs hingedly attached to said top frame segment for folding movement from a collapsed position in close proximity to said top frame segment to a fully extended, generally upright position for support of said top frame segment at said elevated position.

7. An hunting blind as defined in claim 6 wherein:
each of said foldable legs of said base frame has a stakelike end portion which may be pushed into the ground for secure retention of said base frame in the field.

8. An hunting blind as defined in claim 1 wherein:
said ground engaging members attached to said canopy frame comprise a pair of rigid side flaps swingably mounted on opposite sides of said canopy frame, whereby each of said side flaps may be swung outwardly and downwardly from collapsed positions against said canopy frame to generally upright, ground-engaging positions.

9. An hunting blind as defined in claim 8 wherein:
each of said side flaps comprises a frame segment having a pair of generally parallel legs swingably secured at their upper ends to side rod segments of said canopy frame.

10. An hunting blind as defined in claim 9 wherein:
each of said side flaps is of generally U-shaped configuration and comprises a rigid, ground-engaging segment extending between said swingably mounted side flap legs.

11. An hunting blind as defined in claim 9 wherein:
at least one guide stop member is secured to said side rod segments of said canopy frame and depends therefrom in underlying, supporting engagement with one of said side flap legs when said side flap legs are in said generally upright, ground-engaging position, whereby when said canopy frame is swung to said open position said guide stop members will deflect said side flap legs outwardly and downwardly away from said top frame segment, thereby ensuring an unobstruccted field of fire over said top frame segment of said base frame.

12. An hunting blind as defined in claim 11 wherein:
each of said guide stop members has a generally U-shape defined by two arms connected at their outer ends by a base member, said arms being secured at their inner ends to one of said side rod segments of said canopy frame on opposite sides of the point of swingable attachment of said side flap legs thereto, whereby said stop member arms prevent the sliding movement of said side flap legs along said side rod segments of said canopy frame, and said base member acts as a stop support and deflector for said side flap legs.

13. An hunting blind as defined in claim 1 wherein: a foldable camouflage cover is removably secured over said base frame and said canopy frame.

14. An hunting blind as defined in claim 13 wherein: said camouflage cover has openings therein through which the hunter may see out from under said blind.

15. An hunting blind as defined in claim 13 wherein: said camouflage cover is secured to said base frame and to said canopy frame by flexible fastener ties inserted through openings in said camouflage cover and fastened around frame members of said base frame and said canopy frame.

* * * * *